United States Patent
Halasz et al.

(10) Patent No.: US 9,946,927 B2
(45) Date of Patent: Apr. 17, 2018

(54) METHOD AND SYSTEM FOR MARKING AN OBJECT HAVING A SURFACE OF A CONDUCTIVE MATERIAL

(71) Applicant: SICPA HOLDING SA, Prilly (CH)

(72) Inventors: Edmund Halasz, Orbe (CH); Jean-Luc Dorier, Bussigny (CH)

(73) Assignee: SICPA Holding SA, Prilly (CH)

( * ) Notice: Subject to any disclaimer, the term of this patent is extended or adjusted under 35 U.S.C. 154(b) by 85 days.

(21) Appl. No.: 15/026,765

(22) PCT Filed: Oct. 1, 2014

(86) PCT No.: PCT/EP2014/071034
§ 371 (c)(1),
(2) Date: Apr. 1, 2016

(87) PCT Pub. No.: WO2015/049281
PCT Pub. Date: Apr. 9, 2015

(65) Prior Publication Data
US 2016/0259976 A1  Sep. 8, 2016

Related U.S. Application Data

(60) Provisional application No. 61/886,924, filed on Oct. 4, 2013.

(51) Int. Cl.
*G06K 9/46* (2006.01)
*G06K 9/00* (2006.01)
(Continued)

(52) U.S. Cl.
CPC .......... *G06K 9/00577* (2013.01); *B23H 1/08* (2013.01); *B23H 9/06* (2013.01); *G06K 1/128* (2013.01);
(Continued)

(58) Field of Classification Search
CPC ........ G06T 7/0004; G06T 2207/30164; G06K 9/46; G06K 9/00617; G06K 19/086; G06K 19/06121
See application file for complete search history.

(56) References Cited

U.S. PATENT DOCUMENTS 3,710,067 A     1/1973  Ullmann et al.
6,639,172 B1 *  10/2003  Goto ................ B23H 7/02
                                                219/69.12
(Continued)

FOREIGN PATENT DOCUMENTS

GB     2108906       5/1983
MD        3389  F2  8/2005
WO   2010/066644     6/2010

OTHER PUBLICATIONS

Meek et al., "Electrical Breakdown of Gases", John Wiley&Sons, 1978 PP, (published before this application Apr. 2016).
(Continued)

Primary Examiner — Eueng-Nan Yeh
(74) Attorney, Agent, or Firm — Muncy, Geissler, Olds & Lowe, P.C.

(57) ABSTRACT

The present invention describes a method for marking an object (18), the object (18) having a surface of a conductive material. The method comprises a step of applying an electric spark to the surface such that the material is at least one of partially melted and partially ablated by the electric spark, thereby forming a pattern on the object (18). Further, the present application relates to a marking system (10) for marking an object (18) using a spark generator (12) having a counter electrode (14) and a connector (16) for electrically connecting the spark generator (12) to the surface of the object (18) to be marked. Further, the present application relates to an authenticating system for authenticating or
(Continued)

identifying an object (18) marked by the above described method for marking the object (18).

26 Claims, 13 Drawing Sheets

(51) Int. Cl.
  *G06K 1/12* (2006.01)
  *G06K 19/06* (2006.01)
  *G06K 19/08* (2006.01)
  *B23H 9/06* (2006.01)
  *B23H 1/08* (2006.01)
  *G06K 9/62* (2006.01)
  *B23H 1/00* (2006.01)

(52) U.S. Cl.
  CPC ..... *G06K 9/6202* (2013.01); *G06K 19/06121* (2013.01); *G06K 19/086* (2013.01); *B23H 1/00* (2013.01)

(56) References Cited

U.S. PATENT DOCUMENTS

| | | | | |
|---|---|---|---|---|
| 2007/0085337 | A1* | 4/2007 | Endres | B41M 3/14 |
| | | | | 283/81 |
| 2007/0085537 | A1 | 4/2007 | Feiweier | |
| 2008/0166329 | A1 | 7/2008 | Sung et al. | |
| 2008/0292178 | A1* | 11/2008 | Sones | G01N 21/909 |
| | | | | 382/152 |
| 2009/0166329 | A1* | 7/2009 | Cors | B23H 1/08 |
| | | | | 216/67 |

OTHER PUBLICATIONS

Townsend, "Townsend Breakdown Mechanism", The Theory of Ionization of Gases by Collision, Constable & Co. Ltd., 1910, PP, (published before this application Apr. 2016).

Loeb et al., "Streamer Breakdown Mechanism", The Mechanism of Spark Discharge in Air and Atmospheric Pressure I II, Journal of Applied Physics, vol. 11, 1940, pp. 438-447, 459-474, (published before this application Apr. 2016).

Spark Discharge in Air at Atmospheric Pressure. I II Journal of Applied Physics, vol. 11, pp. 438-447 & 459-474, 1940, (published before this application Apr. 2016).

Zhang et al., "Review of shape representation and description techniaues". Pattern Recognition 37, 2004, pp. 1-19, (published before this application Apr. 2016).

"Compendium of Analytical Nomenclature", International Union of Pure and Applied Chemistry (IUPAC), Third Ed. 1997, available at http://iupac.org/publications/analytical_compendium/Cha10sec313.pdf, (On-line version last modified Aug. 14, 2002).

Written Opinion of the International Preliminary Examining Authority (IPEA) dated Sep. 8, 2015 with respect to Application No. PCT/EP2014/071034.

Chinese office action and Search Report in counterpart Chinese Application No. 201480054478.0 dated Nov. 27, 2017 (and English language translation of Office Action).

\* cited by examiner

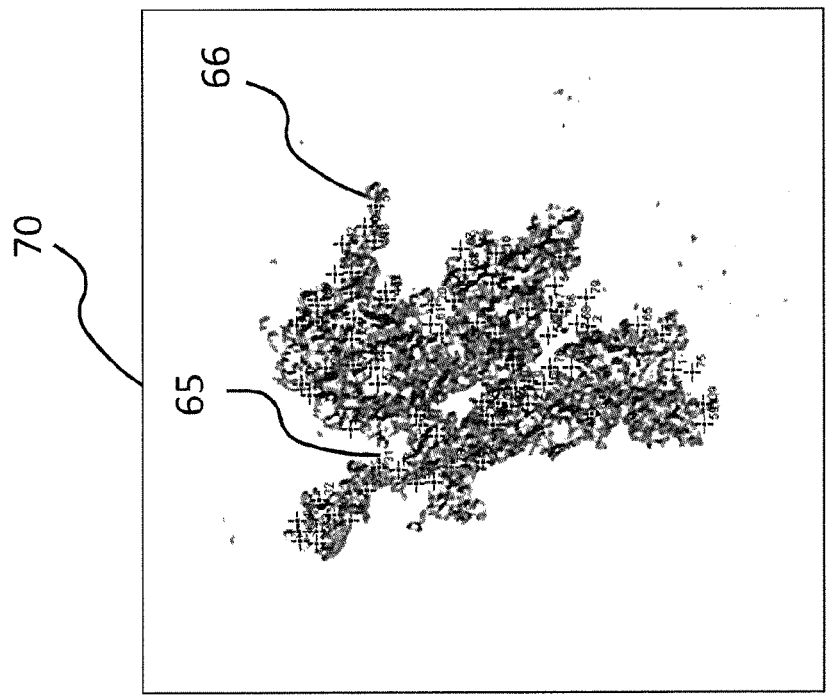
FIG 6a2
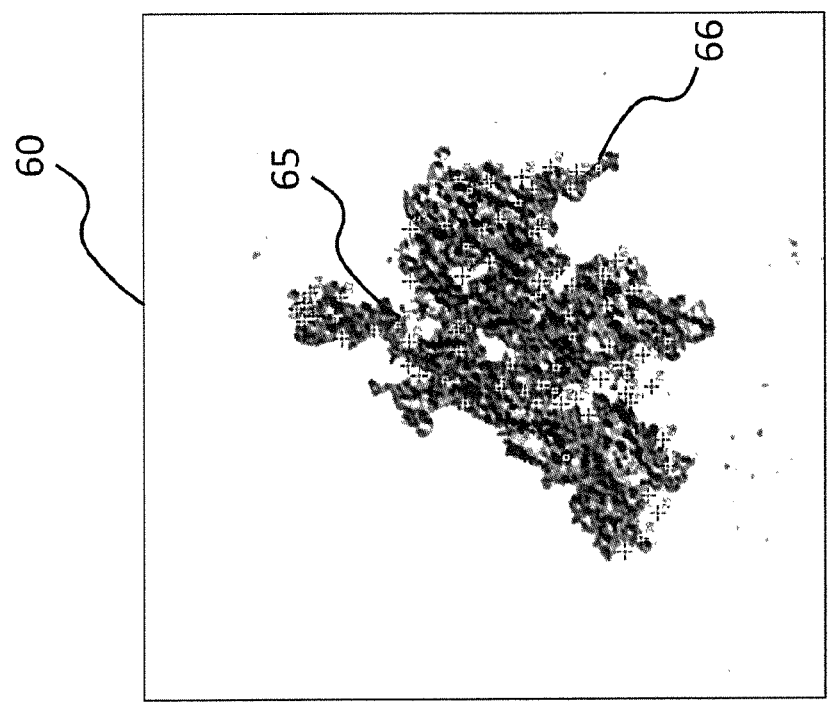
FIG 6a1

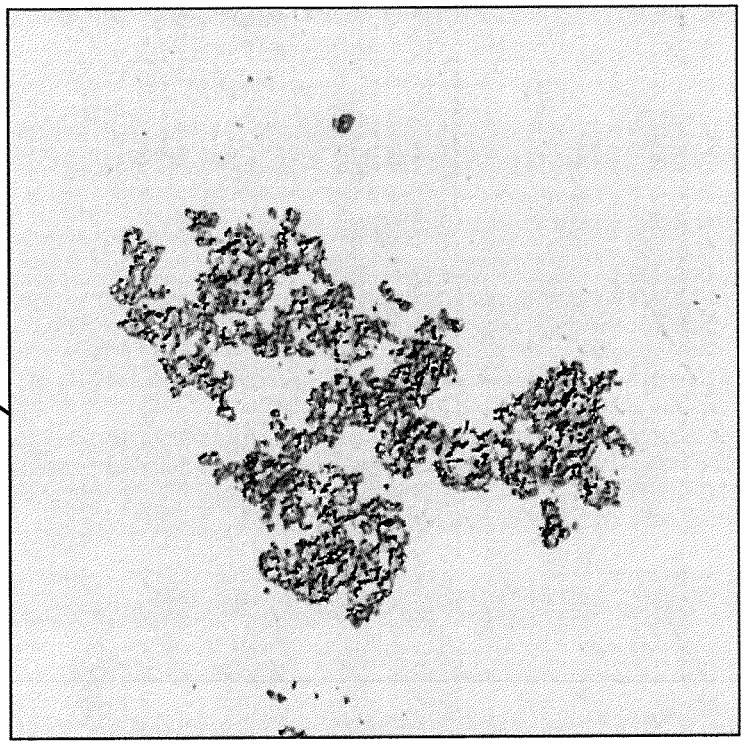
FIG 6b2
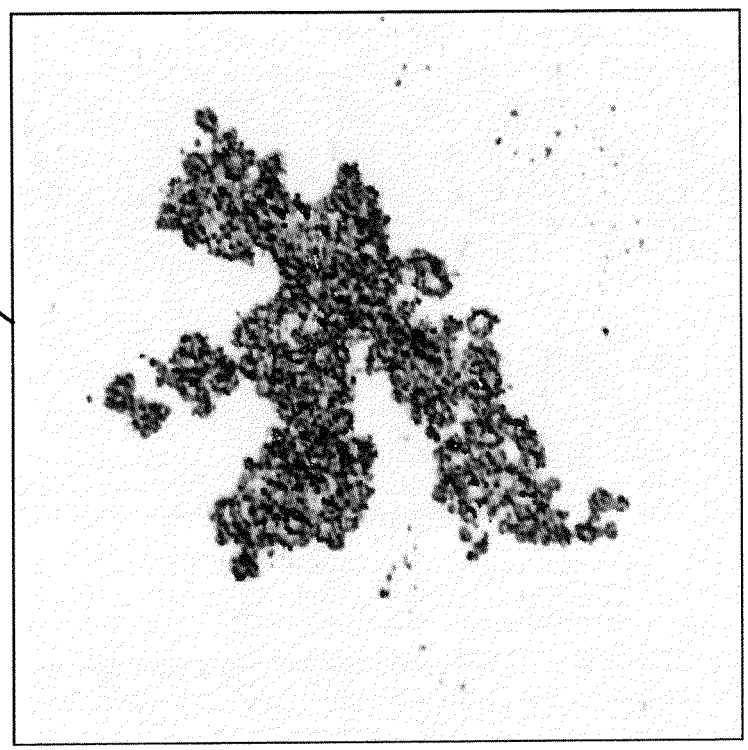
FIG 6b1

METHOD AND SYSTEM FOR MARKING AN OBJECT HAVING A SURFACE OF A CONDUCTIVE MATERIAL

TECHNICAL FIELD

The present invention relates to the field of marking an object having a surface of a conductive material, namely, a method and a system for marking such object. Usually, the marking is suitable for an identification or authentication of the marked object.

BACKGROUND

It is common to mark certain objects such as guns, ammunition or valuables to be able to identify individual objects or to authenticate an object. Generally, the intention can be to apply a mark to an object which mark is unique, comparable to a fingerprint, can be easily recognized and, thus, allows for easy identification or authentication of the object. In this regard, it is an important aim that the mark cannot be copied or counterfeited in as much as possible.

Today, marking solutions are based on unique materials, patterning or physical properties of a mark. Such marks are usually created by printing technology, laser engraving or mechanical engraving. Most of these marks are generated from predetermined code, applied in the form of symbols, and reconfirmed by a reading and identification process. However, such marks can often be copied or counterfeited. This is, because the technology for applying the mark on the basis of a predetermined code can usually also be used by an unauthorized person for counterfeiting or copying the mark. The predetermined code usually is not really random. Only very few marking processes are suitable for producing marks of naturally random characteristics. These processes would have to rely on chaotic dynamic processes in order to be suitable to produce a really random mark. Known random features rely on random arrangement of fibres, bubbles, stains or flakes, which are produced by printing technology or naturally occurring during the manufacturing process. However, most of these processes can hardly be applied to products having a metallic surface, such as guns, ammunition or containers made of metal.

A usual marking technology for marking such objects is laser engraving. Laser engraving technology usually is based on pseudo-random features, wherein the randomness is created by a numerical generator, but not based on chaotic physical phenomena. Further, it is possible to copy such marks by also using laser engraving technology.

MD 3389 F2 discloses a method and apparatus to mark electrically conductive products in a random way using a welding type electrical arc and a vibrator to create randomness. According to this document, material from an electrode is transferred onto a pre-machined grid of the object to be marked to obtain a random mark. A randomness of the mark, which consists of deposited metal on the surface of the object, is obtained by vibrating the electrode and translating the product relative to the electrode. Here, the electrode opposed to the object to be marked is the "cathode" (−) in the electrical circuit, whereas the object to be marked is the "anode" (+). This results in material to be transferred from the electrode towards the surface of the object.

However, also this principle does not result in a true random marking because the vibration of the electrode is controlled and can generally be copied. Further, this method requires extra material of the electrode to be consumed upon forming the mark. The method of the prior art is complicated because of the necessary grid and it requires the surface of the object to be pre-treated.

Accordingly, there is a need for a marking method and respective system for marking objects having a surface of a conductive material, such as metal objects, which allow for uniquely marking objects in a way that cannot be copied or counterfeited.

SUMMARY

It is an object of the present invention to provide a method and a device which allow for uniquely marking objects having a surface of a conductive material so that the mark can only very hardly, if not impossibly, be reproduced, copied or counterfeited, but can easily be recognized and registered. It is a further object of the present invention to provide a method and a device which allow for authenticating or identifying an object having a surface of a conductive material in a very reliable way.

This problem is solved by the method according to claim 1 or 12 and the system according to claim 16 or 24, respectively. Further preferred features of the method or system are recited in the dependent claims and detailed in the following description.

DESCRIPTION

A method for marking an object having a surface of a conductive material comprises a step of applying an electric spark to the surface of the object such that the material of the surface is partially melted, partially ablated, or both, by the electric spark, thereby forming a pattern on the object. This pattern can be used as a mark. By the above method, a randomly shaped crater or a random distribution of randomly shaped craters is created and the material is re-melted and re-deposited in the vicinity of the craters.

It can also be observed, using for example 3D microscopy, that non-molten or partially molten islands of the machined metal surface are present in the spark mark (see FIG. 3). These features are unique to the spark phenomenon and are impossible to reproduce with other marking techniques.

Other unique features are large craters of more than 100 microns width produced by melting a significant amount of the surface material (see FIG. 3). At the periphery of the spark mark, one can also observe very small craters of less than 10 microns width which are typically produced by a single anodic arc root. Other unique features are tiny splashes of molten metal of less than 2 microns width (FIG. 3).

The shapes and distribution of the craters as well as the re-melted and re-deposited material provide for a random and unique appearance of the mark on the basis of the physical nature and the chaotic behaviour of the spark. This exhibits a complex three-dimensional microscopic and macroscopic structure which can only very hardly, if not impossibly, be copied by any known technique, in particular laser engraving or similar methods.

In particular, by using 3D microscopy, one can infer the typical crater depth and protrusion height with respect to the original unmarked surface, as illustrated in FIG. 4.

A system for marking an object having a surface of a conductive material comprises a spark generator, a counter electrode electrically connected to the spark generator such that the counter electrode forms an anode and a connector for electrically connecting the spark generator to the surface such that the surface forms a cathode with respect to the counter electrode. The counter electrode is located with respect to the surface such that an electric spark can be generated between the counter electrode and the surface such that the material of the surface is partially melted, partially ablated, or both, by the electric spark. Thereby, the above-mentioned pattern can be formed on the object.

Electrically connecting the spark generator to the surface encloses a situation in which the surface and the spark generator are both grounded or otherwise brought to the same electrical potential such that a sufficient potential difference between the counter electrode and the surface arises upon activation of the spark generator.

Benefits of the method are uniqueness of each obtained mark and the impossibility to reproduce its topology by other means such as laser ablation, printing or mechanical engraving.

FIGS. 5a and 5b illustrate marks obtained by various other engraving or marking techniques, for comparison with a marking according to the invention as exemplarily illustrated on FIG. 5c.

When sparking a thick conductive surface, a mark in the material can be obtained having an erratic two-dimensional distribution with a raw structure and a fine structure. In this context, "thick" means thicker than several millimeters (but at least thicker than a half of a millimeter) and may depend on the material and sparking conditions. The mark obtained by the above method then has inherent three-dimensional micrometric scale properties as it consists of one or preferably many craters and re-deposited molten material droplets (see FIGS. 3 and 4).

When sparking thin metallic surfaces, the material can be completely ablated in certain areas and a random mask with microscopic features can be obtained. In this context, "thin" means a thickness of several micrometers (but at least thicker than one micrometer). If applied onto a second material this mask could exhibit a security feature using, for example, fluorescence from a background material.

The mark may depend on at least one of the nature of the material (both chemical and topological like surface roughness) to be sparked, the time distribution of the injected current in the spark's conductive channel gap, and the environment in which the spark is generated (e. g. air or argon, nitrogen or another inert gas). Varying these parameters allows a great variety of mark appearances which hence allow extracting extremely diverse features that can be used for generating a very high volume of unique identifiers or attributes.

The obtained marks can have the potential of exhibiting, by light or electron microscopy analysis, a topology and surface shape which undoubtedly show that they are the result of sparks but no other means. Hence, the mark obtained by the above method is particularly secure with regard to copying or counterfeiting.

The timely duration of a spark being of the order of magnitude of tens of microseconds to hundreds of microseconds allows marking of labels on printing lines, or of products on production lines, operating at a comparably high speed.

Accordingly, the spark marking process described herein allows for very efficiently marking objects. The method does not take much time and is not expensive. The method does not consume material but only modifies the material on the surface of the object. It is possible to apply a mark on a relatively small area of the object which, in turn, allows the mark to be applied also to very small objects such as the jackets of ammunition or similar objects. Also, thin metallic layers, such as layers of metallic ink printed on a label, can be marked by the spark marking method described hereinabove. Further, it is not required that the surface of the object to be marked is specifically prepared, provided with anchor marks or otherwise pre-treated. Furthermore, the intrinsic complexity of the spark marks allows for guaranteeing a unique and irreproducible mark and a high capacity for information to be encoded onto the object to be marked.

The surface of a conductive material can preferably be a metallic surface. This surface can be of a bulk metal or a foil of metal deposited on an object of a different material. Further, it is possible to apply the method also to objects having a surface provided with a conductive ink. The conductive nature of the surface is useful for the generation of the electric spark in order to modify the surface. Generally, it is also possible that the object is made of multiple layers having a conductive material close to the actual surface so that it is possible to apply a spark to the surface of the object via the conductive material closely underneath the actual surface of the object. Heat generated in the conductive material then still allows for partially melting, partially ablating, or both, of material of the object at the surface to thereby create the pattern of the mark.

An electric spark as understood in the present text can be further described as follows. An electrical breakdown is created between two electrodes when a sufficiently high voltage is applied. When the high voltage exceeds the breakdown voltage for a given electrode gap, gas, pressure and temperature, the breakdown mechanism occurs.

Several breakdown criteria for insulating gases have been reported by Meek, J. M. Craggs J. D. "Electrical Breakdown of Gases", John Wiley & Sons, New York, U.S.A., 1978—initial publication in 1923, the content of which is hereby incorporated herein by reference. Two well accepted breakdown criteria in gases are the "Townsend Breakdown Mechanism" as described by Townsend, J. S. in "The Theory of Ionization of Gases by Collision". Constable & Co. Ltd., London, U. K., 1910, the content of which is hereby incorporated herein by reference, and the "Streamer Breakdown Mechanism" described by Loeb, L. B. Meek, J. M. in "The Mechanism of Spark Discharge in Air at Atmospheric Pressure. I II" Journal of Applied Physics, Vol. 11, pp. 438-447 459-474, 1940, the content of which is hereby incorporated herein by reference.

The Townsend Breakdown Mechanism criterion is based on a sequence of avalanches and depends on "remote" electron generation processes at the cathode. It usually prevails in low pressure conditions where electron collisions are reduced in the electrode gap and is not relevant to spark discharges at atmospheric pressure, unless the electrode gap is very small.

The Streamer Breakdown Mechanism criterion depends on an avalanche to streamer transition, due to "instantaneous" local electron generation giving rise to a critical avalanche that causes instability in the gap and induces gap-breakdown.

In-between there is a transition region in which we observe some of both mechanisms. The breakdown is an extremely fast process, taking place within several tenths of nanoseconds; this duration depends on the nature, pressure and temperature of the gas and also depends on the extent of the electrode gap.

When only high voltage is applied between the two electrodes, the discharge is called "electrostatic discharge". In this case, the conductive channel will vanish and the plasma will extinguish by recombination processes and practically no substantial melting or ablation of cathode material can occur. Hence, a mark on a material would be punctual and microscopic and not be a mark according to the understanding of the present description.

After the breakdown of the gap the voltage drops to several tenths of volts thank to an increase of the conductivity, current can be injected from a current source into the conductive channel. The injected current will augment the ionization processes necessary to sustain the discharge plasma.

The energy thus being applied to the cathode at the position where the spark foot is attached is sufficient for enabling partial melting and/or ablating of cathode material. This process allows electrons to sustain the spark current to be extracted from the cathode material. A part of the ablated material can then re-condensate nearby the crater created by the ablation and may create favourable conditions for new melting/ablation areas. This kind of chaotic hopping mechanism allows for random patterns of craters and deposited material on the surface of the cathode.

Spark generators and arrangements to ablate material are well known, especially in view of spectro-chemical analysis. They are used either in spark optical emission spectrometers/spectrographs, where the spark plasma is the radiation source, or in inductively coupled plasma spectrometers, where the sparks act as aerosol generators. A document describing these arrangements is the "Compendium of Analytical Nomenclature", chapter 10, of the International Union of Pure and Applied Chemistry (IUPAC), available at http://iupac.org/publications/analytical_compendium/Cha10sec3 13.pdf.

Usually, a spark generator comprises two circuits, the first one for creating a gap breakdown high voltage and the second one for injecting current into the conductive channel. These circuits can be set in parallel or in series.

Preferably, the conductive material of the object forms a "cathode" (−, emitting electrons or otherwise negatively charged particles), whereas the counter electrode, by which a spark generator can form the electric spark, forms an "anode" (+, attracting electrons or otherwise negatively charged particles). This configuration of the electrical circuit(s) prevents transfer of material from the electrode onto the surface of the object to be marked and facilitates marking of the surface by melting or ablating effects.

Further preferably, the surface is exposed to a gas, in particular air, argon or nitrogen or another inert gas, while the electric spark is applied to the surface. The nature of the spark and, thus, the mark created by the spark can be modified by influencing the atmosphere next to the surface of the object. As an alternative to air, argon or nitrogen or another inert gas can be used to prevent oxidation of the mark or the surface in the vicinity of the mark. Preferably, it is possible to control the type and composition of the gas in that the method is conducted in a housing where the atmosphere, in particular the type of gas, its pressure and temperature can be reliably controlled.

Preferably, the method for marking the object further comprises taking a first image of at least a part of the pattern, extracting at least one first characteristic feature from the first image of the pattern, associating the first characteristic feature to the object, and storing information of the first characteristic feature and the associated object.

Further preferably, the first characteristic feature is used to generate a first code, preferably an encrypted first code, the first code preferably being attached or printed to the object. The first code can have the form of a barcode, an alphanumeric code or a digital code such as an RFID. It is preferred that the code is easily machine readable.

In a preferred embodiment, the pattern is assigned to a second code, preferably a serial number, which is independent of the pattern and is configured to serialize the pattern on the object, which second code is preferably attached or printed to the object. The second code can be an identification means for the object marked by the pattern. It is, thus, easily possible to read information as to the object when reading the second code without the need to evaluate the pattern on the object. However, the second code, alone, is not as secure as the mark applied by the before-mentioned method. Hence, the second code is meant to be an additional information on the object which can facilitate handling of the object.

In particular, the information of the first characteristic feature and the associated object is stored in a remote storing device. A remote storing device can be a central storage which preferably is available remotely, e. g. via a secure network or similar data connection. Thus, it is possible to access the information stored in the remote storing device from almost any place.

A method of authenticating or identifying an object marked by using a method as described above comprises taking a second image of at least a part of the pattern, extracting at least one second characteristic feature from the second image of the pattern, and comparing information of the second characteristic feature with the stored information of the first characteristic feature to identify matching information.

If an object, such as a gun, is to be authenticated or identified, the pattern on it can be imaged, characteristic features can be extracted from the pattern, at least from a part of it, and be compared to corresponding features stored in a database. If the features are found in the database as being assigned to a certain object, the object having the imaged pattern on it is identified or authenticated.

Preferably, at least one of the first and second code is read as well. In this case, it can additionally be confirmed whether the codes are correctly applied to or printed on the object.

In a preferred embodiment, at least one of the information of the second characteristic and the at least one of the first and second code are transmitted to a remote storing device. This allows for very reliably authenticating or identifying the object in that, on the basis of the second characteristic features extracted from the image of at least a part of the pattern, the comparable first characteristic feature can be identified by comparing the information of the first and second characteristic features so that the object being assigned to the first characteristic feature is unambiguously identified or authenticated.

In a preferred embodiment, the first and second characteristic feature comprises at least one of coordinates of individual craters or melted zones of the pattern, preferably with respect to a reference mark, a mean diameter of an individual crater or melted zone of the pattern, a relative distance between at least two craters or melted zones of the pattern, and a contour of the pattern or a part of the pattern.

As regards potential image processing algorithms or methods for extract and/or comparing characteristic features or information an image of a pattern, reference is made to Dengsheng Zhang et al. "Review of shape representation and description techniques", Pattern Recognition 37 (2004), 1-19, the content of which is hereby incorporated herein by reference. There are many possible methods, some of which being based on contours, others on regions of the pattern to be determined. Both contours and regions can potentially be used in connection with the present invention.

There are modern trends in pattern recognition algorithms and descriptors. In some of these, binary strings are used as descriptors and the comparison or matching is performed using a Hamming distance. Examples of descriptors are:

BRIEF: (Binary Robust Independent Elementary Features)
Pairwise intensity comparison in an image patch.
The only parameters are the spatial arrangements and the length.

BRISK: (Binary Robust Invariant Scalable Keypoints)
Same as BRIEF but with a fixed spatial arrangement, and also orientation and scale estimation.

FREAK: (Fast Retina Keypoint)
Spatial arrangement motivated by the human visual system.
Pairs of pixels used for comparison are learned using training data.

An example of image matching is given in FIG. 6.

BRIEF DESCRIPTION OF THE DRAWINGS

FIG. 5a shows images of surfaces marked by acid etching 51, sand blasting 52, anodizing 53, plasma spraying 54 and laser ablation 55, FIG. 5b shows images of surfaces treated with laser marking 56, FIG. 5c shows a spark mark 57 according to the invention.

FIGS. 6a1, 6a2, 6b1 and 6b2 show illustrations of a method to extract image features and to determine whether an image matches a reference image (allowing thus the identification of a mark). FIGS. 6a1 and 6a2 illustrate a comparison of two different images of the same mark, 60 and 70, taken by different cameras. FIGS. 6b1 and 6b2 illustrate a comparison of two different images, 61 and 71, of two different marks, taken by different cameras.

In FIG. 7a, 41 represents a model of a genuine spark mark texture. A histogram of a real genuine spark mark texture is represented by 42 and a histogram of a fake spark mark texture is represented by 43, i. e. a mark which resulted from a technique other than spark mark.

FIG. 7b shows that spark marks can be discriminated in most cases 32 using only one configuration of the LBP operator.

DETAILED DESCRIPTION OF THE DRAWINGS

Figure 1:
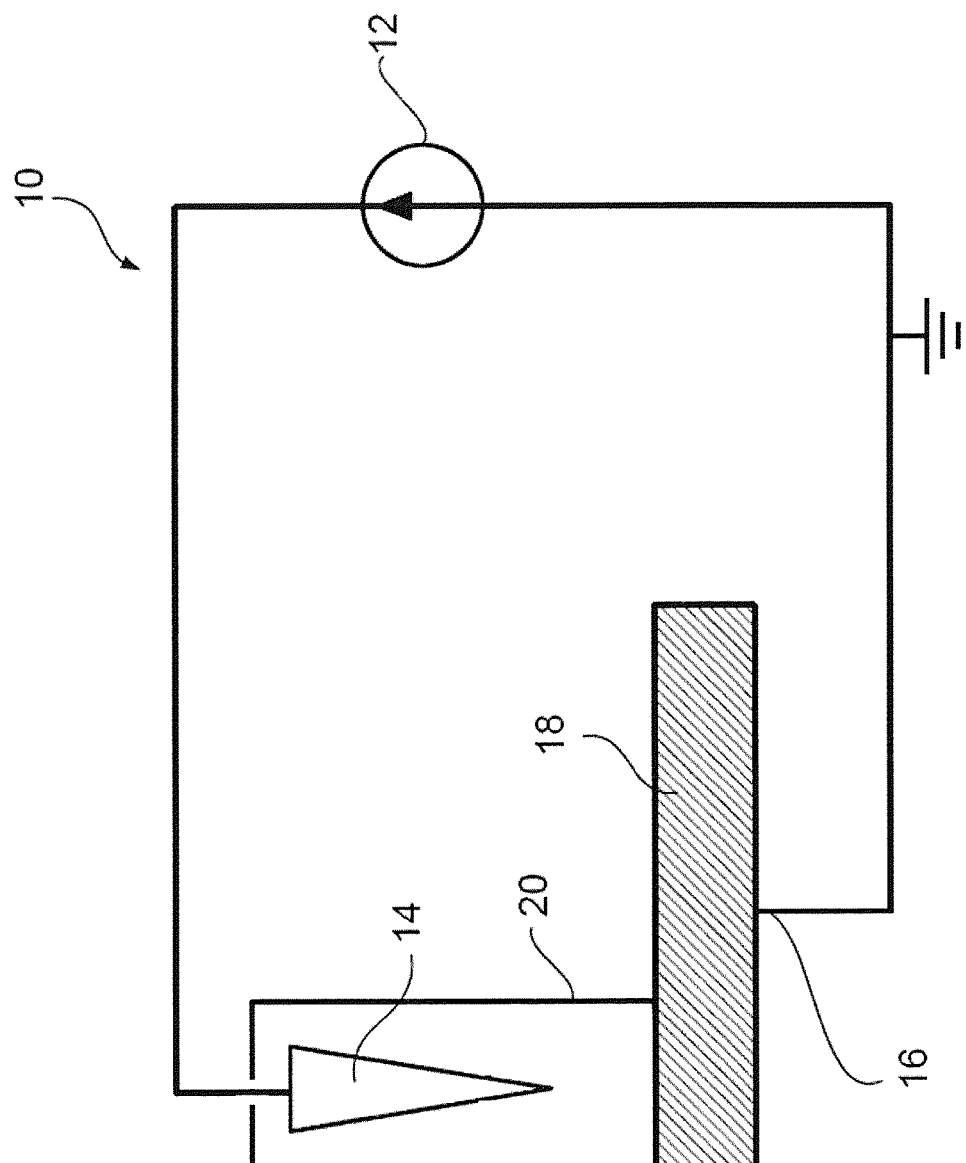
FIG. 1 illustrates schematically a setup of a system for marking an object in accordance with the present invention.

FIG. 1 illustrates schematically a setup of a system 10 for marking an object 18 in accordance with a preferred embodiment. The system 10 for producing sparks and thereby generating random marks as described above comprises a spark generator 12, a counter electrode 14 and a connector 16 for electrically connecting the spark generator 12 to the object 18 to be marked. Optionally, the system comprises a housing 20 for controlling a protective gas environment above the object to be marked. The housing may further confine the protective gas. The spark generator 12 is electrically connected to the counter electrode 14 and the object 18.

Figure 2B:
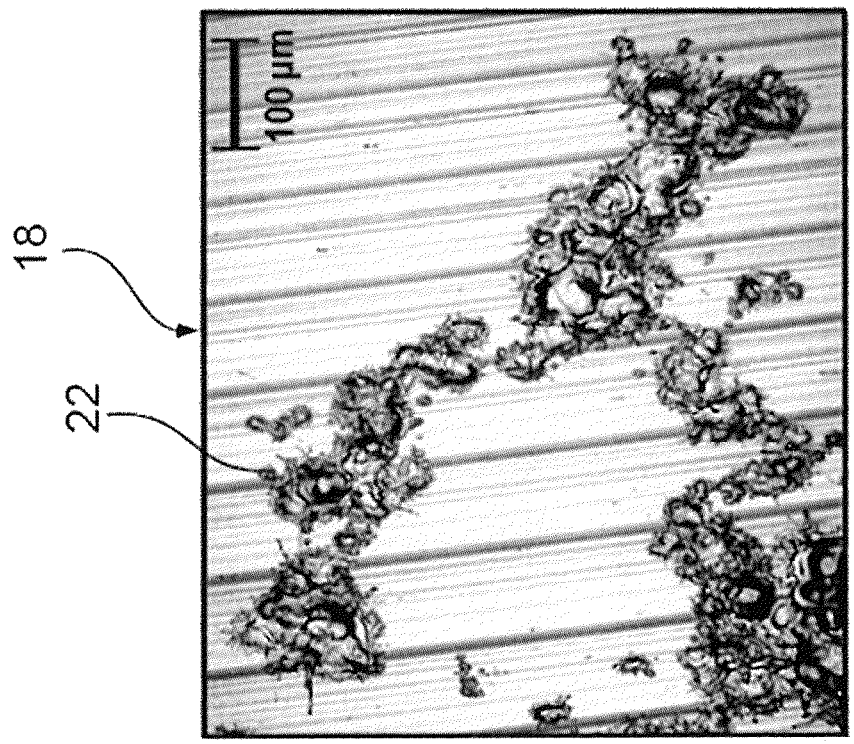
FIGS. 2a and 2b illustrate a typical mark 18 obtained by a single spark in argon atmosphere on a metallic object.
Figure 2A:
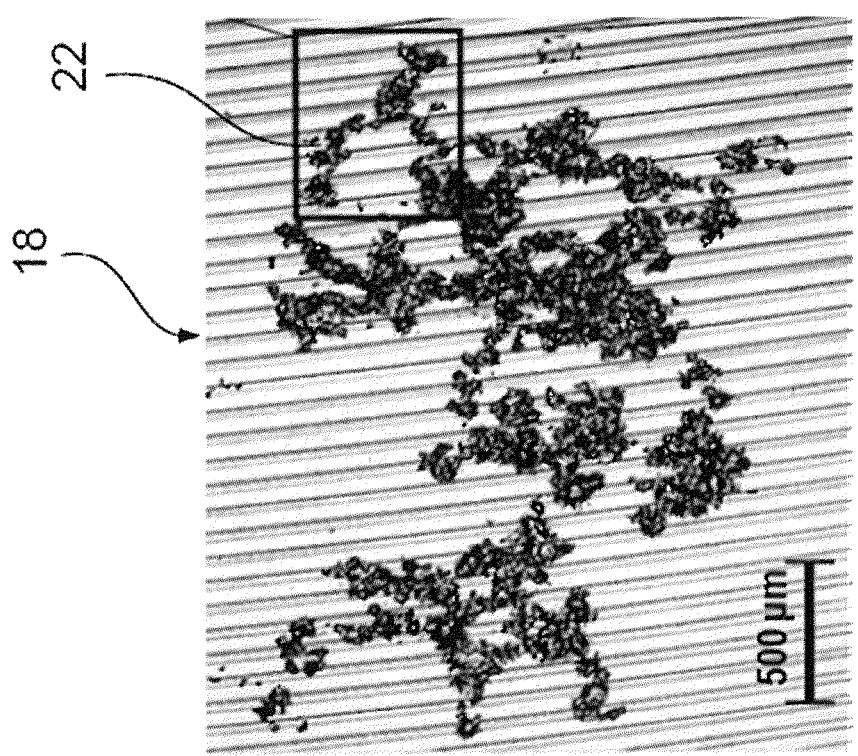

A single mark 22 obtained from a single spark created between the counter electrode 14 and a clean and non-oxidized metallic surface of the object 18 may spread over several square millimeters and may present a three dimensional raw structure and fine structure. The mark may consist of hundreds of microscopic craters, from which material was ablated, and sample deposits, created by condensation of a part of the ablated material or solidification of molten material. Then, the mark presents a raw structure in the form of compact "islands", as is exemplarily illustrated in FIG. 2a, and a fine structure in the form of cathodic craters and deposited spots, as is exemplarily illustrated in FIGS. 2b, 3a and 3b. The localization, together with the depth of the craters 28 and the height of the deposits or protrusions 27, as illustrated in FIGS. 4a and 4b, is random and can, by use of means or methods available today, not be reproduced (see FIGS. 5a-5c).

The topology of the raw structure and the contours can be used even if imaging capabilities are insufficient to visualize microscopic details. This may be the case if, for example, a photo camera of a smartphone or other handheld device is used for identifying the mark. Extracting features of similar size is well known in the field of image processing and computer vision. An illustration is given in FIG. 6a1 and FIG. 6a2, where characteristic features 65 and 66 can be extracted from both images 60 and 70 of the same mark taken with different cameras.

Figure 5A:
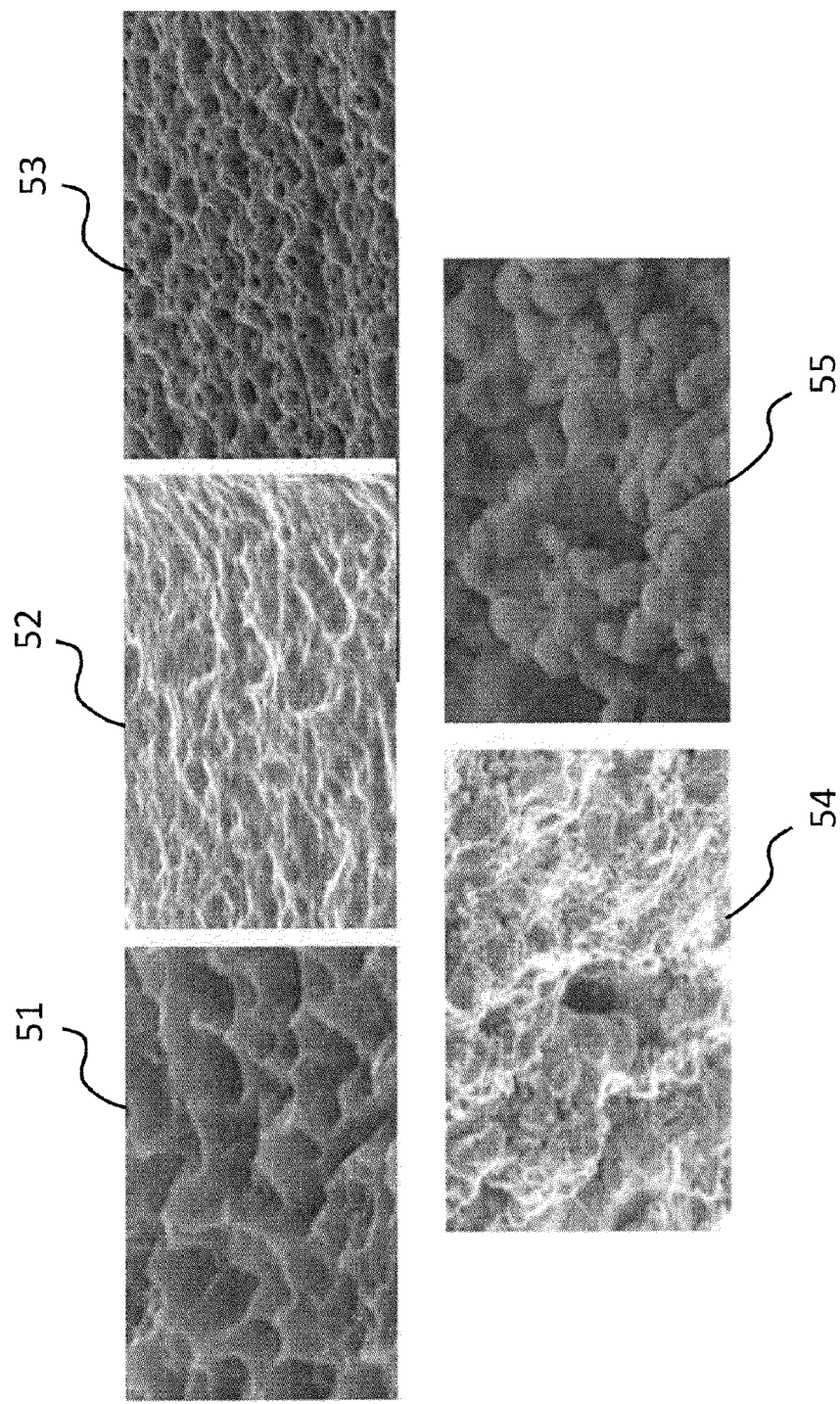
FIGS. 5a to 5c give examples of surface textures which are typical for various marking and engraving techniques as compared to spark marks.
Figure 5B:
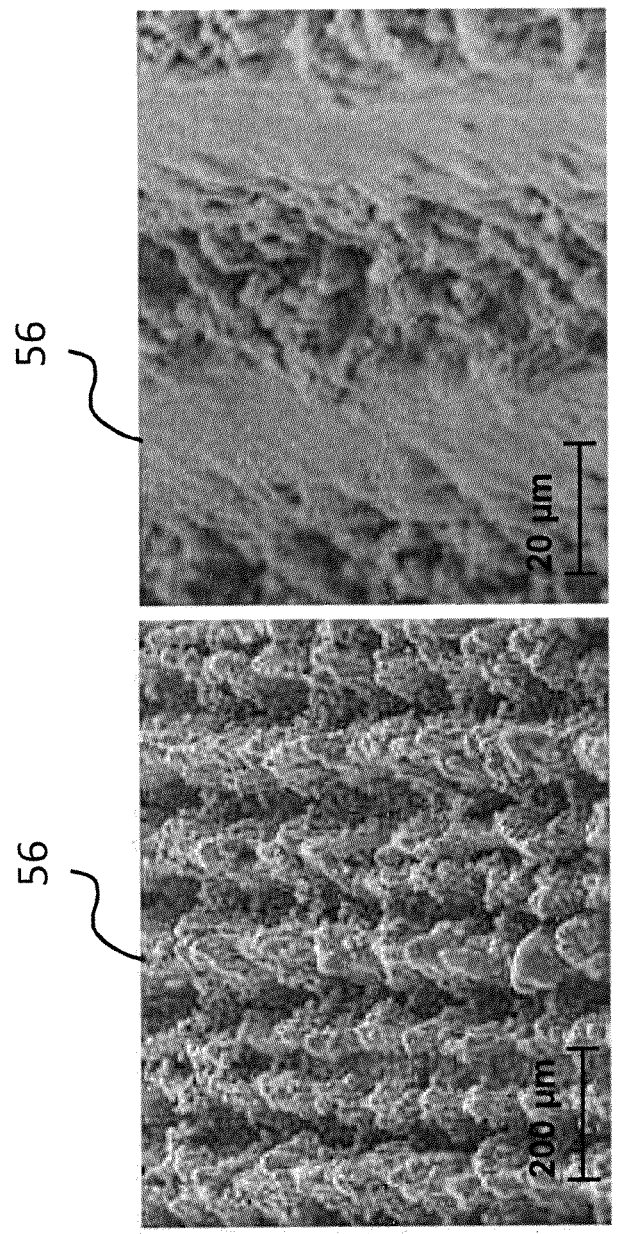
Figure 5C:
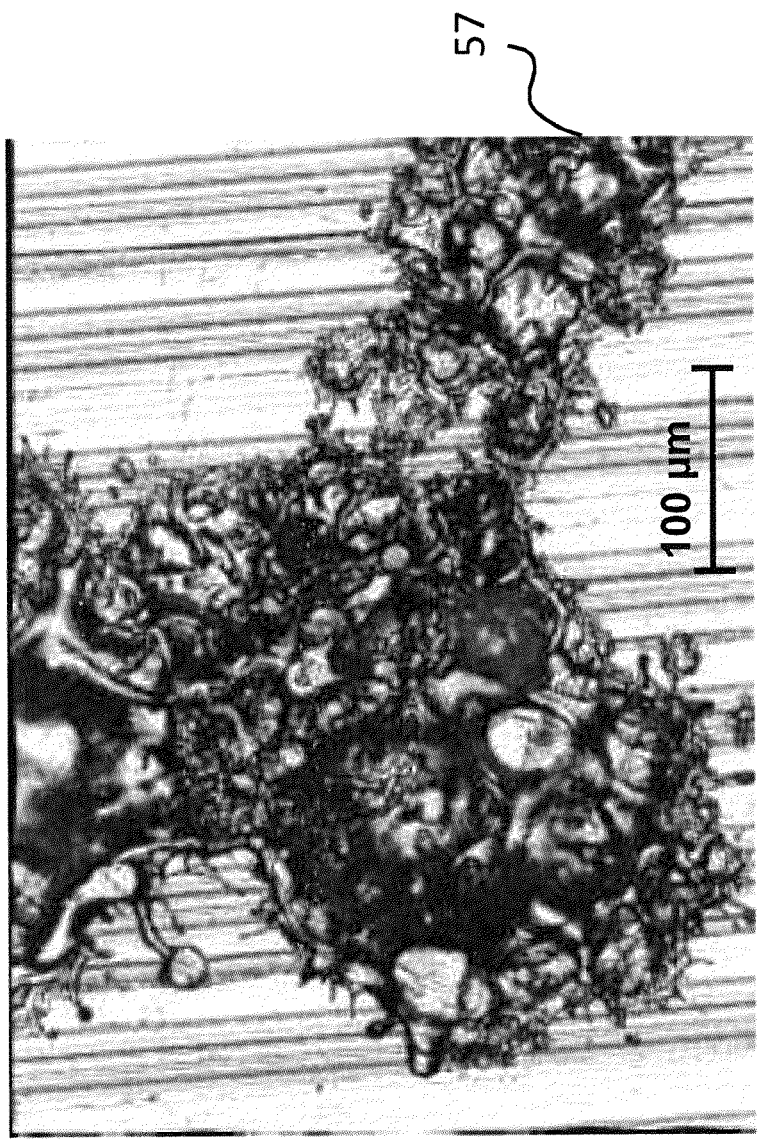

Texture analysis can be used to determine if a mark has been created by sparking the metal's surface or by another mean such as the ones described in connection with FIGS. 5a and 5b. This can generally be done for authentication purposes, without identifying a particular mark associated uniquely with a marked object, i. e. without identifying a particular object. One example of texture analysis makes use of a Local Binary Patterns (LBP). These are simple operators describing microstructures around a pixel (Texton). They are robust to (global) grayscale variations and rotation invariant. They are parameterized by the radius of search and the number of neighbors for each pixel in the image. For the current examples, the simplest LBP operator, using 8 neighboring pixels, was used. The texture is represented by the distribution of the uniform LBP codes computed at each pixel and across the whole image. Texture identification is made through histogram comparison.

Figure 7A:
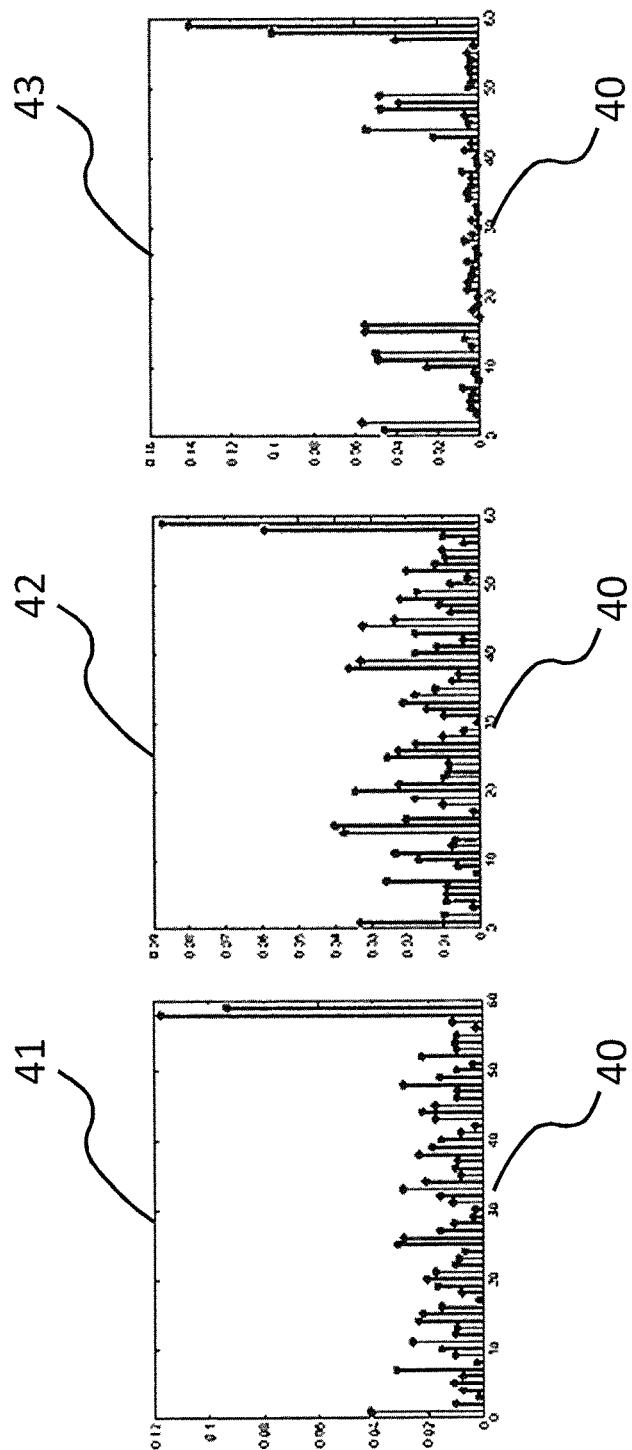
FIG. 7a illustrates typical histograms of local binary patterns 40.
Figure 7B:
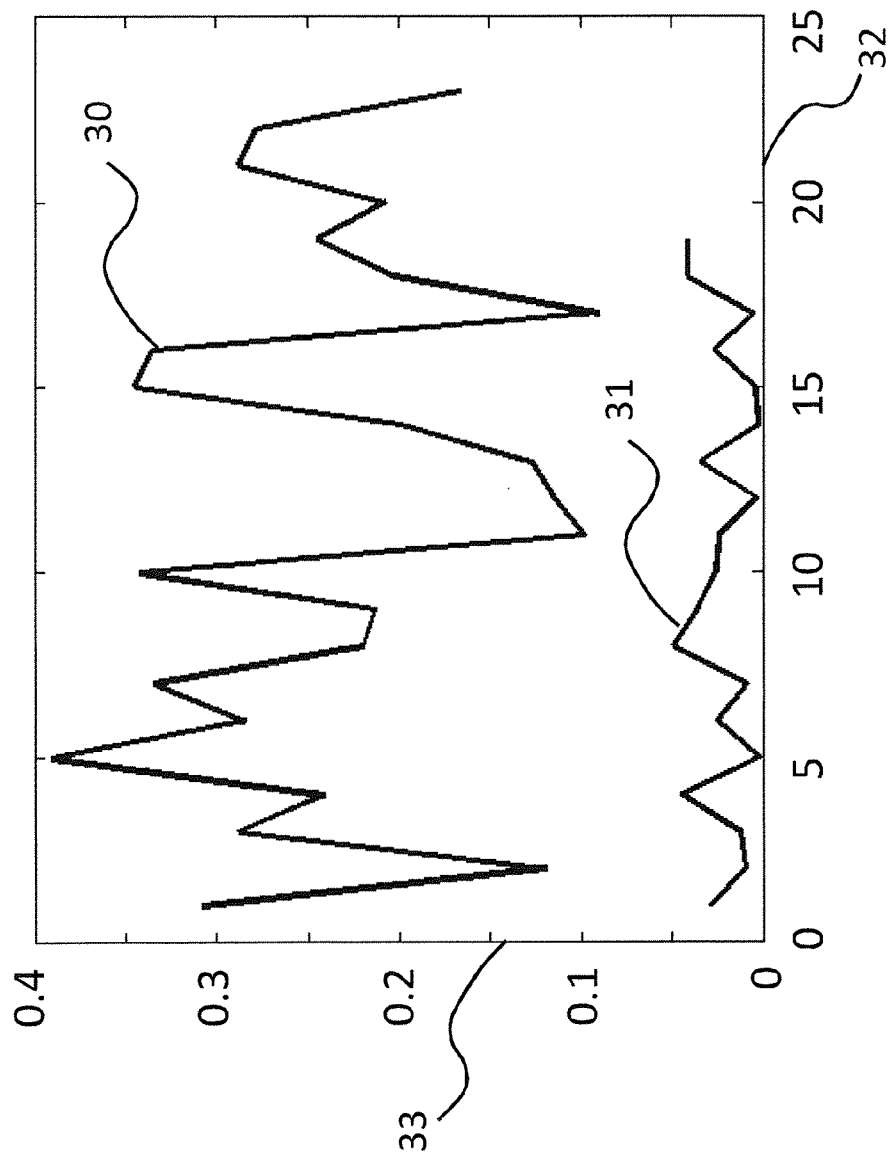
FIG. 7b illustrates the differences 33 of the histograms of the real genuine spark mark and the genuine spark mark model 31, on the one hand, and the real fake spark mark and the genuine spark mark model 30, on the other hand.

An example of texture recognition and matching is presented in FIGS. 7a and 7b. FIG. 7a shows histograms of the LBP occurrences for the model spark mark 41, an example of a genuine spark mark 42 and a mark obtained by another technique 43 (also named as a fake mark). FIG. 7b shows that the genuine and fake marks can be discriminated from their respective histogram distance 33 to the spark mark model. A clear separation of the histogram distance of the fake mark to the model 30 from the histogram distance of the genuine mark to the model 31 is achievable using only one LBP scheme for several different samples 32.

The detection of the macrostructure and microstructure of a mark can be compared to the problem of "blobs detection". Blobs detection refers to mathematical methods that are aimed at detecting regions in a digital image that differ in properties, such as brightness, compared to areas surrounding those regions. The blobs are efficiently detected by standard image processing algorithms and their properties can be calculated to extract specific signatures as illustrated in FIGS. 6a1 and 6a2 where the blobs 65 and 66 can be detected and matched on two images of the same spark mark taken with different cameras. In FIG. 6a1, image 60 corresponds to the image used to enroll the specific signature of the mark in the database, and image 70 in FIG. 6a2 corresponds to the image of the same spark mark to be authenticated and identified. On the other hand, FIG. 6b2 shows a candidate image 71 which does not come from the same spark marks as the one enrolled 61 and illustrated in FIG. 6b1. Here no common features are found.

Figure 3A:
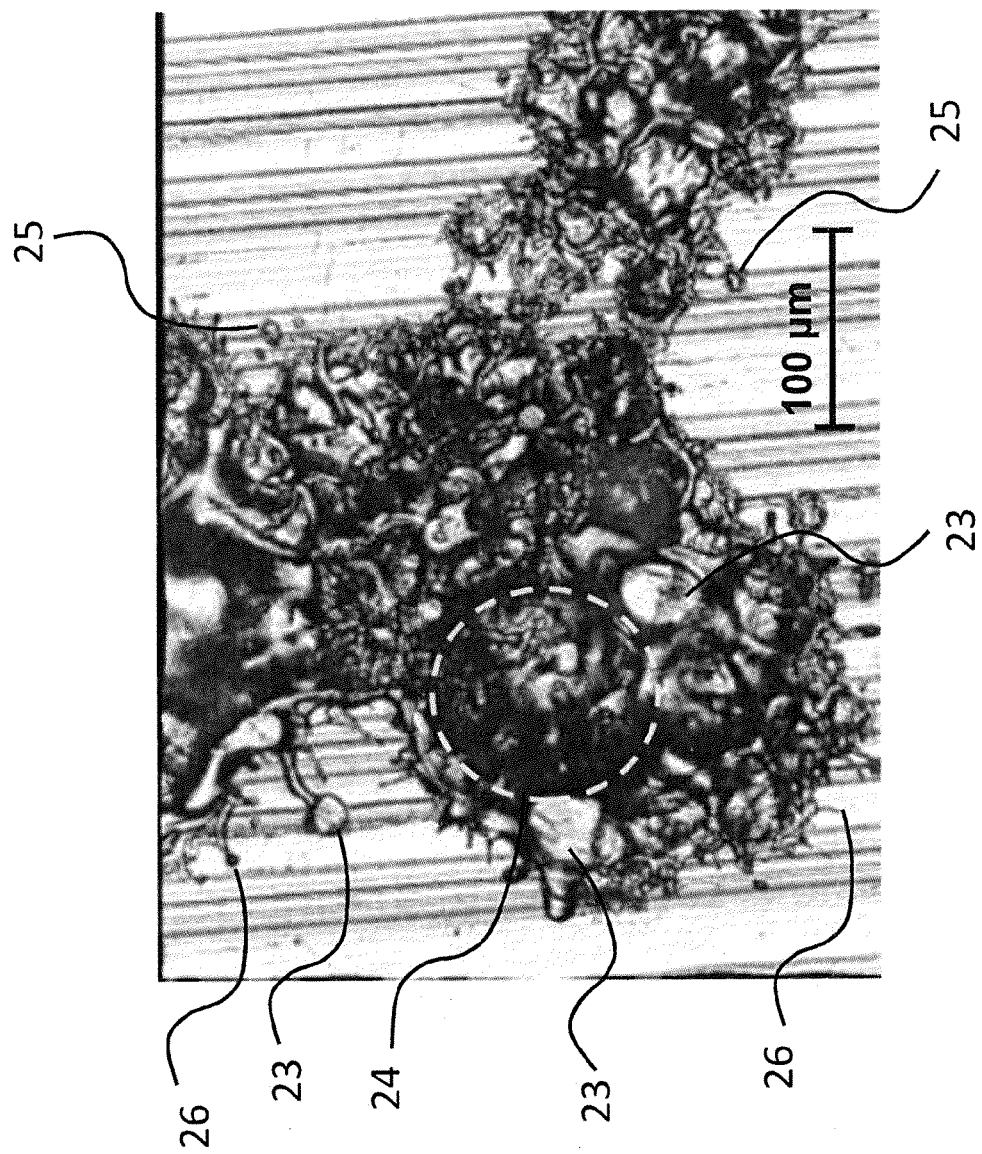
FIGS. 3a and 3b show remarkable topological features which are typically observed on a spark mark. Such features are e. g. displaced non-molten islands 23, large and deep craters 24 of widths of up to 100 μm, small craters 25 of widths of less than 10 μm or tiny molten metal splashes 26 of widths of typically about 2 μm.
Figure 3B:
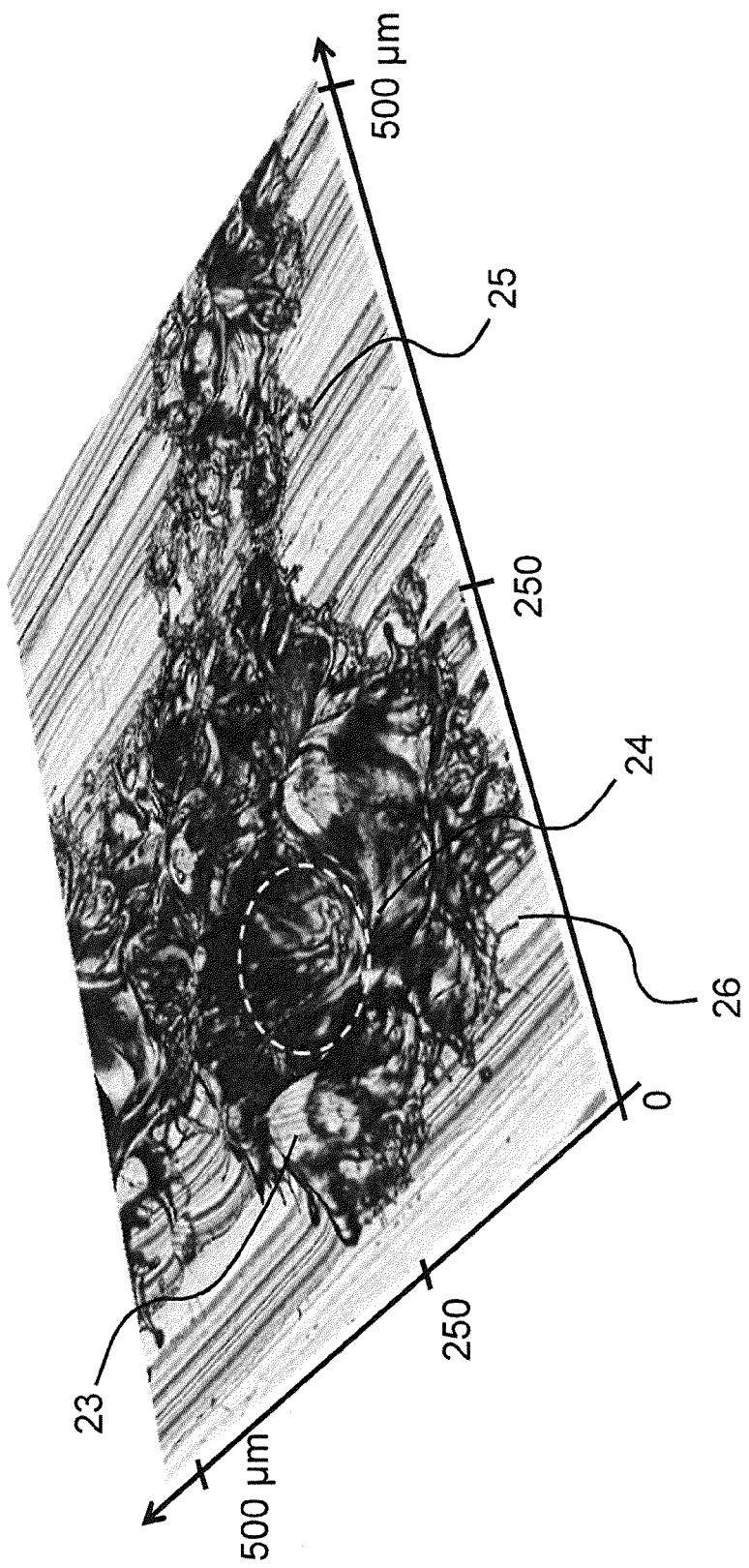
Figure 4A:
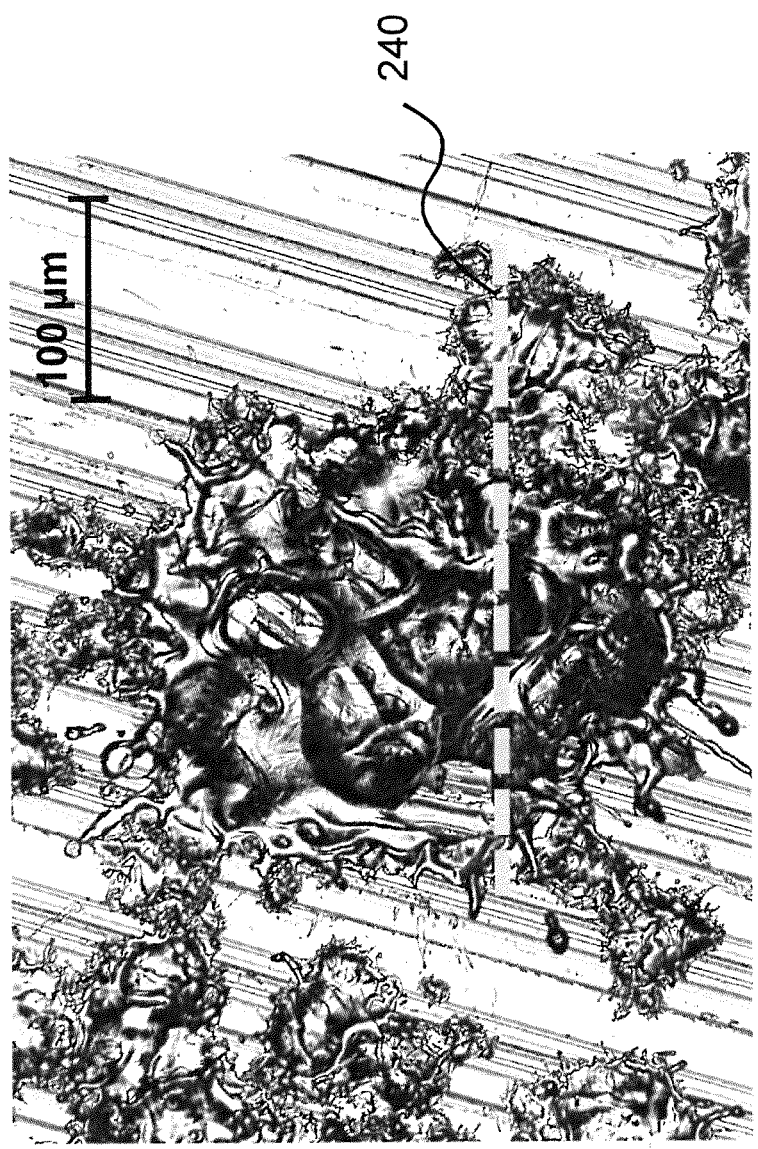
FIG. 4a illustrates a typical spark mark in top view.
Figure 4B:
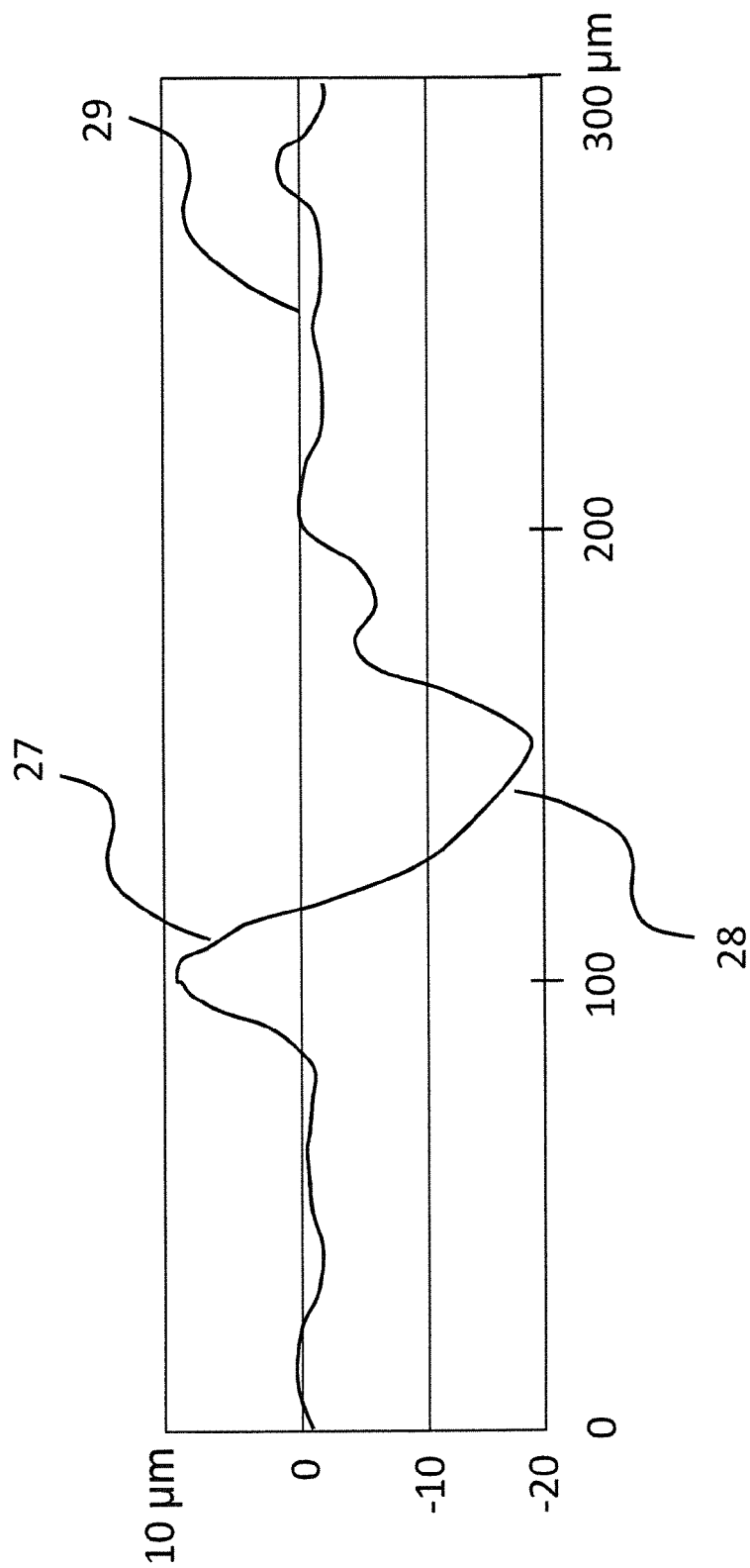
FIG. 4b illustrates a vertical profile of the spark mark of FIG. 4a along dotted line 240 in FIG. 4a. The vertical profile shows protrusions 27 from the originally planar horizontal surface 29 of up to 10 μm and craters 28 of depths of up to 20 μm from the originally planar horizontal surface. Non-molten islands protrude from their initial position on the original surface up to 15 μm.

The topology of the microscopic structure, contours, and the brilliant and dark aspect modification by changing an illumination, a focusing plane or a viewing angle can be used to characterize the fine structure for example small craters 25 or tiny molten metal splashes 26 as shown in FIGS. 3a and 3b. This is possible by using, for example, light microscopy. Information extracted from the fine structure can be used either for semi-forensic authentication to guarantee that a given mark has been produced by spark, or to determine a specific signature at a microscopic level. For the latter, it would be preferable to enroll signatures with a standard microscopic imaging process which is reproducible.

By changing a focusing plane of a light microscope, under constant illumination, evidence of 3D structures can be obtained (see FIG. 3b and FIGS. 4a and 4b). Similarly, scanning electron microscopy (SEM) technology can be used to identify 3D structures of the marks obtained from spark marking as described herein. A 3D structure, such as illustrated in FIGS. 3b, 4a and 4b, of small dark craters representing material ablation and larger bumps visualizing solidified metal droplets can be examined and be used for identification or authentication purposes. This structure is very specific to the spark cathodic root effect on the surface and cannot be reproduced by any other marking process known today. FIGS. 3a and 3b illustrate some remarkable structures found in spark marks.

The materials to be marked are preferably metallic. Examples are thin metallic strips in banderols or bulk metallic parts, products, cans, etc. The metallic surface preferably is clean, free of grease, non-oxidized and with a roughness equivalent to that obtained by fine milling, grinding or cold rolling. Although pre-treating the surface is not essential for the method or system to work, a standard appearance of the surface before the application of the method to the surface or the respective object, respectively, facilitates using the marks for identification or authentication. A typical average roughness Ra for these kinds of manufacturing methods is 6 micrometers or 250 microinches, as expressed, for example, by the US standard ASME Y14.36M or the ISO 1302, or preferably less. However, also rougher surfaces are generally suitable to be treated by the above method.

In one exemplary application of the method, metallic strips integrated on banderols can be sparked for secure marking. A spark marking can be applied at a specific part of the strips. The strip may be of Al, Cu, Ti, Ag, or any of their alloys or other soft metal.

In another exemplary application, canned products are marked, directly on the protected or unprotected can material. Usually, the outside surface of metallic cans is protected by a thin layer of UV cured basecoat epoxy and/or acrylic. This layer can be ablated by the spark and a combined mark: varnish and metal can be obtained, depending on the spark energy. Marking of other types of metallic containers, such as perfume, jewelry or valuable luxury goods boxes or containers can also be performed by the sparking method. The metallic luxury products themselves can be also marked. For example the metallic parts of jewelry, which may be of Au, Ag, Pt, Pd and other precious metals or of their alloys can be marked by the method of the present invention.

In another exemplary application, guns and ammunition cartridges are marked by the sparking method. Preferably, the marks can be produced on a clean metallic area of the part or on an area which has been digitally marked before, e. g. embossed or engraved. The engraved marks can direct the spark so that the mark is created around any engraved symbols. The final pattern will hence be a combination of a deterministic digital mark, such as a serial number, and additional random and unique features produced by the spark method.

In another exemplary application, a surface of a conductive material present on some mechanical component or spare part used in motor industry or in aeronautic industry is marked by the sparking method according to the invention. This is particularly useful for identifying or authenticating components which are important with respect to safety of users: for example, brake linings of a car or landing gear of an aircraft. Indeed, these (usually expensive) components are more and more frequently counterfeited, with the consequence that they generally do not fulfil required quality standards.

As an illustrative example, a marking system using spark discharge according to the invention comprises the following elements:
1. A unidirectional spark generator providing high voltage of 6-15 kV to break the gap between the electrode and the surface to be sparked and further injecting current with various time patterns and energies. Depending on the metal type, the injected current takes values between 10-150 Amps, while the voltage is around 30 V. The spark duration from breakdown to the extinction can be between 30 and 200 microseconds.

In this example of a marking system, the discharge process has three main periods:
Firstly, a short burst of less than 1 microsecond, in which the high voltage is applied and the breakdown occurs;
secondly, a second phase, in which current of up to several tenths of Amperes is injected, with a duration of 2 to 10 microseconds; and
thirdly, a third phase, in which the current is decreased and maintained at a level of less than 20 Amperes. The duration of this third phase can be between 50 and 200 microseconds, e. g. depending on the type of metal.

Such spark generators are well known and used mainly for the spark-Atomic Emission or optical emission spectrometers, in the scope of spectro-chemical analysis of metals and their alloys. A reference document describing a spark generator is WO 2010/066644 A1, the content of which being hereby incorporated herein by reference.

2. A discharge gap, formed by a counter electrode, usually made of, but not limited to, tungsten which counter electrode is configured to act as the anode, on the one hand, and the material to be sparked at ground potential, which is thereby configured to act as the cathode, on the other hand. The material can be put to ground potential by a contact electrode.

3. Optionally, the counter electrode and the material can be surrounded by a protective gas such as argon or nitrogen or another inert gas, which may be confined in a protective housing 20, in order to prevent oxidation of the mark.

4. Optionally, the counter electrode can be annular and configured for the protective inert gas to be injected through the tip of the electrode. Or the electrode can be surrounded by a co-axial, annular gas injection nozzle.

An illustrative example of a configuration for marking, enrolment and activation of marked objects is described below.

A first operation is the spark marking as outlined above of the guns. The objects, for example guns, parts of guns or ammunition jackets, to be marked are kept by electrically grounded chucks mounted on a conveyer in such a way that the surface to be marked is presented in the same orientation and at the same distance from the counter electrode. The mark is created on the object and subsequently the mark is imaged by a combined light source and camera module. After the image is acquired, the individual features of the mark are extracted and encoded.

The code and optionally the image are securely sent to a data management system and enrolled in a database.

After the objects, for example the guns, have been delivered to their users, they can be examined by using an adequate handheld device capable of macro-imaging, extracting the image macro features, and sending the obtained code and/or the image via a secured link to the data management system.

Here the received information, namely, the code and/or the image are matched to the existing records in the database so that the object can be identified on the basis of the enrolled entry of the database.

A higher level of authentication of the mark can be made in a local microscopy laboratory, if the handheld device is not capable of microscopically examining the marked object.

The mark can be authenticated by a handheld device or with laboratory equipment.

Usually, with a handheld device and using ambient or specific illumination, details of a size of more than 10 micrometers can be observed so that the raw structure characteristics can be observed. In this case, the image processing will be based especially on the topology and contour recognition of the agglomerates of cathodic craters and material deposits and no interpretation will be made on the luminosity of the elements in the image. The topology and the contour details are information vectors and can be coded. The coding process can be made on the device and the result can be sent, in an encrypted communication to a data management system for interrogating the authenticity, similar to the above described method.

Laboratory equipment for authenticating may comprise an optical microscope using polarized light. The microscope can detect peaks of re-melted material as well as valleys or craters of ablated material by imaging bright and dark patterns. By changing the focusing plane, bright areas can change to dark areas while maintaining their shape.

Further, the microscope can be used with an automated image processing software that can recognise patterns of elementary cathodic craters. The software could perform texture analysis algorithms with a predefined model, such as, for example Local Binary Pattern analysis to determine if the observed mark belongs to the class of spark marks and not to other types of marking techniques shown for example in FIGS. 5a and 5b as described in connection with FIGS. 7a and 7b.

Examples for a basis of an authentication or identifying method:

1) Shape Signature

A shape signature represents a shape by a one dimensional function derived from shape boundary points. Many shape signatures exist. They include centroidal profile, complex coordinates, centroid distance, tangent angle, cumulative angle, curvature, area and chord-length.

2) Scale Space

A scale space representation of a shape can be created by tracking a position of inflection points in a shape boundary filtered by low-pass Gaussian filters of variable widths. As the width of Gaussian filter increases, insignificant inflections are eliminated from the boundary and the shape becomes smoother. The inflection points that remain present in the representation are expected to be significant object characteristics. The result of this smoothing process is an interval tree, called fingerprint, consisting of inflection points.

While the invention has been described above with respect to certain examples and embodiments, the scope of protection is not limited by these examples or embodiments.

The invention claimed is:

1. Method for marking an object (18), the object (18) having a surface of a conductive material, the method comprising
   applying an electric spark to the surface
   such that the material is at least one of partially melted and partially ablated by the electric spark,
   thereby forming a pattern on the object,
   wherein the surface is exposed to a gas while the electric spark is applied to the surface, and
   wherein the electric spark comprises two subsequent phases, a first phase where a conductive channel is formed and a second phase where current is injected into the conductive channel for at least one of partially melting and partially ablating the material.

2. Method of claim 1, wherein a spark generator (12) is electrically connected to the conductive material and to a counter electrode (14),
   the conductive material thus forming a cathode and
   the counter electrode (14) thus forming an anode.

3. Method of claim 1, wherein the gas is air, argon or nitrogen.

4. Method of claim 1, wherein the spark takes ten microseconds up to several hundred microseconds.

5. Method of claim 1, wherein the first phase is shorter than the second phase.

6. Method of claim 1, wherein the material comprises at least one of a metal, such as iron, steel, aluminum, copper, titanium or alloys of these metals, and a conductive composite material.

7. Method of claim 1, wherein the object (18) is a gun, a piece of ammunition, a can, a value good, a package, a label, a piece of jewelry, or part thereof.

8. Method of claim 1, further comprising
taking a first image of at least a part of the pattern,
extracting at least one first characteristic feature from the first image of the pattern,
associating the first characteristic feature to the object (18), and
storing information of the first characteristic feature and the associated object (18).

9. Method of claim 8, wherein the first characteristic feature is used to generate a first code, preferably an encrypted first code, the first code preferably being attached or printed to the object.

10. Method of claim 8, wherein the pattern is assigned to a second code, preferably a serial number, which is independent of the pattern and is configured to serialize the pattern on the object, which second code is preferably attached or printed to the object.

11. Method of claim 8, wherein the information of the first characteristic feature and the associated object is stored in a remote storing device.

12. Method of authenticating or identifying an object (18) marked by using a method of claim 8, the method for authenticating comprising
taking a second image of at least a part of the pattern,
extracting at least one second characteristic feature from the second image of the pattern,
comparing information of the second characteristic feature with the stored information of the first characteristic feature to identify matching information.

13. Method of claim 12, further comprising
reading at least one of a first and a second code.

14. Method of claim 13, further comprising transmitting at least one of the information of the second characteristic feature and the at least one of the first and second code to a remote storing device.

15. Method of claim 12, wherein the first and second characteristic feature comprises at least one of coordinates of individual craters or melted zones of the pattern, preferably with respect to a reference mark, a mean diameter of an individual crater or melted zone of the pattern, a relative distance between at least two craters or melted zones of the pattern, and a contour of the pattern or a part of the pattern.

16. Marking system (10) for marking an object (18), the object (18) having a surface of a conductive material, the system comprising
a spark generator (12),
a counter electrode (14) electrically connected to the spark generator (12) such that the counter electrode (14) forms an anode,
a connector (16) for electrically connecting the spark generator (12) to the surface such that the surface forms a cathode with respect to the counter electrode (14),
wherein the counter electrode (14) is located with respect to the surface such that an electric spark can be generated between the counter electrode (14) and the surface,
wherein the electric spark comprises two subsequent phases, a first phase where a conductive channel is formed and a second phase where current is injected into the conductive channel for at least one of partially melting and partially ablating the material,
such that the material is at least one of partially melted and partially ablated by the electric spark,
thereby forming a pattern on the object,
the marking system (10) comprising a housing (20) enclosing a space between the counter electrode (14) and the surface, wherein the housing (20) is filled with a gas.

17. Marking system (10) of claim 16, wherein the counter electrode (14) comprises tungsten.

18. Marking system (10) of claim 16, wherein the gas is air, argon or nitrogen.

19. Marking system (10) of claim 18, wherein the counter electrode (14) is configured for the gas to be injected through the tip of the counter electrode (14) into the housing (20), or wherein the counter electrode (14) is surrounded by a coaxial gas injection nozzle configured for the gas to be injected into the housing (20).

20. Marking system (10) of claim 16, wherein the material comprises at least one of a metal, such as iron, steel, aluminum, copper, titanium or alloys of these metals, and a conductive composite material.

21. Marking system (10) of claim 16, wherein the object (18) is a gun, a piece of ammunition, a can, a value good, a package, a label, a piece of jewelry, or part thereof.

22. Marking system (10) of claim 16, further comprising
a first imaging device for taking a first image of at least a part of the pattern,
a memory comprising computer program code,
a processor,
wherein the memory and the computer program code are configured, with the processor, to cause the marking system to:
extract at least one first characteristic feature from the first image of the pattern,
associate the first characteristic feature to the object (18), and
store information of the first characteristic feature and the associated object (18).

23. Marking system (10) of claim 22, further
comprising a storing device, wherein the storing means is adapted for storing the information of the first characteristic feature and the associated object (18) in the storing device, wherein the storing device preferably is remote from the first imaging device.

24. Authenticating system for authenticating or identifying an object (18), the authenticating system comprising
a marking system (10) comprising:
a first imaging device for taking a first image of at least a part of the pattern,
a memory comprising computer program code,
a processor,
wherein the memory and the computer program code are configured, with the processor, to cause the marking system to:
extract at least one first characteristic feature from the first image of the pattern,
associate the first characteristic feature to the object (18), and
store information of the first characteristic feature and the associated object (18), the authenticating system further comprising:
a second imaging device for taking a second image of at least a part of the pattern,
a memory comprising computer program code,
a processor,
wherein the memory and the computer program code are configured, with the processor, to cause the authenticating system to:
extract at least one second characteristic feature from the second image of the pattern, and compare information of the second characteristic feature with the stored information of the first characteristic feature for identifying matching information.

25. Authenticating system of claim 24, wherein the memory and the computer program code are configured, with the processor, to cause the authenticating system to read a code, preferably a barcode or alphanumeric code on the object (18).

26. Authenticating system of claim 25, wherein the memory and the computer program code are configured, with the processor, to cause the authenticating system to transmit at least one of the information of the second characteristic feature and the code to the storing means.

\* \* \* \* \*